July 30, 1963   L. P. SKLAR   3,099,335
STRUCTURAL BEAM
Filed Nov. 15, 1960
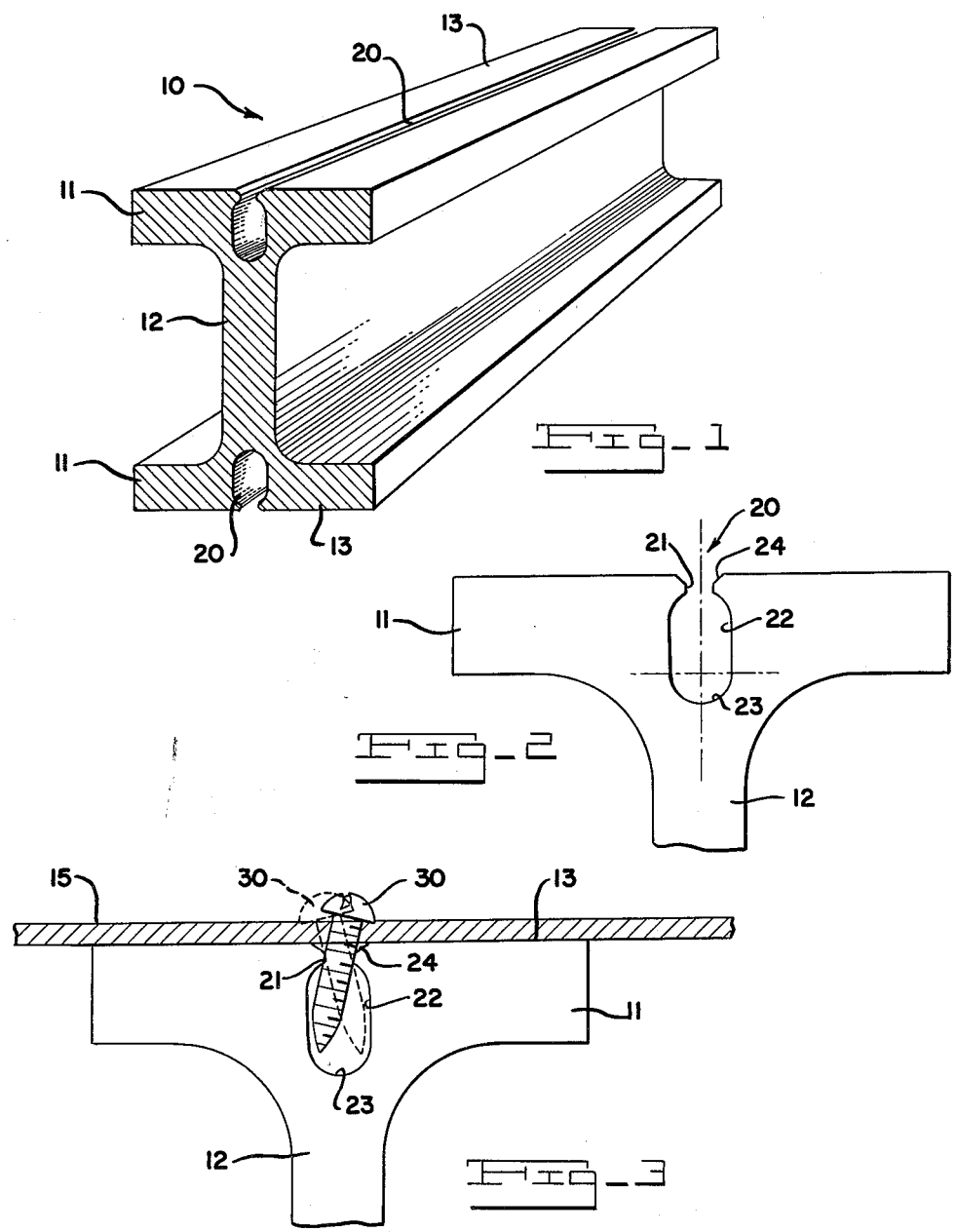
INVENTOR.
LEO P. SKLAR
BY Cullen & Cantor
ATTORNEYS

United States Patent Office 3,099,335
Patented July 30, 1963

3,099,335
STRUCTURAL BEAM
Leo P. Sklar, Detroit, Mich., assignor to Lite-Vent Industries, Inc., Detroit, Mich.
Filed Nov. 15, 1960, Ser. No. 69,306
1 Claim. (Cl. 189—37)

This invention relates to a structural beam.

In the fabrication of awnings and similar types of roofs, it is common to use structural support beams which may be shaped as I-beams or some such similar configurations and to which the roof sheet metal sections are fastened. This fastening is generally accomplished by pre-drilling the beam and tapping the holes so that screws can be inserted through the sheet metal and threaded into the tapped holes in the beam.

Since awnings and the like are frequently assembled on the job, it is difficult and inconvenient to reach and to thread the various screws into the beam and frequently, these screws are broken off while they are being threaded. Also, since these beams are frequently made of relatively soft metal, such as aluminum, the threads are frequently stripped or broken.

Thus, it is an object of this invention to provide a support beam, which is of a material which is sufficiently soft to be tapped by a self-tapping screw, with a groove arranged so that screws may be inserted at any point in the groove without the necessity of having pre-drilled and pre-tapped openings and wherein the grooves are so formed that the screws need not be accurately inserted but may be cocked at an angle, and further, wherein the screws engage the groove only at a narrow mouth portion, to reduce damage and to increase the speed of assembly.

These and other objects and advantages of this invention will become apparent upon reading the following description, of which the attached drawings form a part.

In these drawings:

FIG. 1 is a perspective view of a length of the beam of this invention.

FIG. 2 is an enlarged, fragmentary, end view of a beam, and

FIG. 3 is a view similar to FIG. 2, but illustrates a sheet of metal screwed to the beam by a self-tapping screw.

The beam illustrated herein, is of the conventional I-beam configuration which is widely used as a structural support for roofs, and the like. Preferably, it is formed of aluminum or some other metal which may be tapped by self-tapping screws. The invention hereof is not limited to I-beams, but may be applied to other configurations of structural beams.

The beam 10 is provided with a pair of flanges 11 which are parallel and spaced apart and interconnected by an integral web 12. The beam may be formed by an extrusion process and is of uniform cross-section throughout its length.

The exposed faces 13 of the flanges 11 form contact surfaces against which other articles, such as sheets of metal, may be arranged in face to face contact. Thus, FIG. 3 illustrates a piece of sheet metal 15 laid in face to face contact with the exposed face 13 of one of the flanges 11.

The beam is provided with a groove or slot 20 in each of its flanges, with the grooves opening into the exposed face at a narrow mouth portion 21. As shown in FIG. 2, the narrow mouth portion extends only a short way into the depth of the groove and the groove, whose depth is approximately twice its width, is considerably wider below the mouth portion at 22 and has a closed bottom 23. The depth of the groove is greater than the thickness of the flange, so that the closed bottom 23 is within the web portion.

The mouth portion is widened slightly at the exposed face 13 by having its edges chamfered oppositely at 24 (see FIG. 2), and is of a width which is slightly less than the diameter of a predetermined size self-tapping screw.

In operation, a sheet 15 or the like is placed upon the exposed surface 13 of flange 11 and is secured thereto by means of screws 30 which are driven through the sheet and into the groove. As many screws as are needed may be used by simply spacing them along the length of the groove. Because of the shape of the groove, the screws need not be driven true to the axis of the groove or the structural beam but may be driven at an angle or cocked so that the assembler need not take any care or precaution while driving the screw in. The screw engages only the small narrow mouth portion 21 which is of a size sufficient to engage only a few threads of the screw. The chamfer on the one side of the mouth portion with the widened portion on the other side of the mouth portion permit a wide variation in the angular position of the screws, as shown for example, by the solid and dotted line illustrations of the screw in FIG. 3.

The screw is self-tapping and thus forms its own thread in the narrowed mouth portion, and because of the thickness of the narrowed mouth portion cannot be broken or stripped in the process of driving it into the groove.

This invention may be further developed within a scope of the following attached claim. Accordingly, it is desired that the foregoing description be read as being merely illustrative of an operative embodiment of this invention and not in a strictly limiting sense.

I now claim:

A structural I-beam of solid, uniform cross-section having a pair of spaced apart parallel flanges joined together by a web integral with and normal to the flanges, the flanges and web each being of substantial thickness and being formed of a metal which is substantially rigid and non-resilient but sufficiently soft as to be engaged by a self-tapping type screw fastener; an elongated, uniform cross-section, closed bottom slot formed in one of the flanges, the slot being aligned with the central axis of the web and extending the full length of the beam and opening at the exposed face of the flange, that is, the face opposite to that which the web joins; the mouth of the slot being formed with a continuous, central, narrowed portion of considerably less width than the width of the slot and being of a width to receive and engage with a self-tapping screw of a predetermined diameter, and with the narrowed portion of the mouth extending towards the closed bottom of the slot only a short distance of approximately a few threads of the screw, the slot being of a depth which is approximately twice its width and having its closed bottom located within the web but close to the slotted flange; the opposite side edges defining the mouth at said exposed face being oppositely chamfered, with the depth of the chamfered portion being approximately the same as the depth of the narrowed portion, wherein the mouth at the surface of the exposed face is wider and tapers towards the narrowed mouth portion located closely adjacent to the exposed face; and with the beam solid cross-sectional area which surrounds and defines the slot being of sufficient thickness so that the area defining the narrow mouth portion is rigid and non-resilient; wherein a screw may be tapped into the mouth narrowed portion while being inserted into the slot, with all but a small part of the screw being free of securement to the beam and with the end part of the screw being free to fit within the slot at an acute angle relative to the exposed face.

References Cited in the file of this patent

UNITED STATES PATENTS

| | | |
|---|---|---|
| 1,495,570 | Blakeley | May 27, 1924 |
| 1,586,053 | Synder | May 25, 1926 |
| 2,200,227 | Olson | May 7, 1940 |
| 2,440,053 | Macomber | Apr. 20, 1948 |
| 2,976,970 | Toney | Mar. 28, 1961 |

FOREIGN PATENTS

| | | |
|---|---|---|
| 85 | Great Britain | Jan. 11, 1861 |
| 652,569 | Great Britain | Apr. 25, 1951 |